Aug. 21, 1934.  J. ROBINSON  1,970,980
AUTOMATIC TRAIN PIPE COUPLING
Original Filed Dec. 15, 1930   2 Sheets-Sheet 1
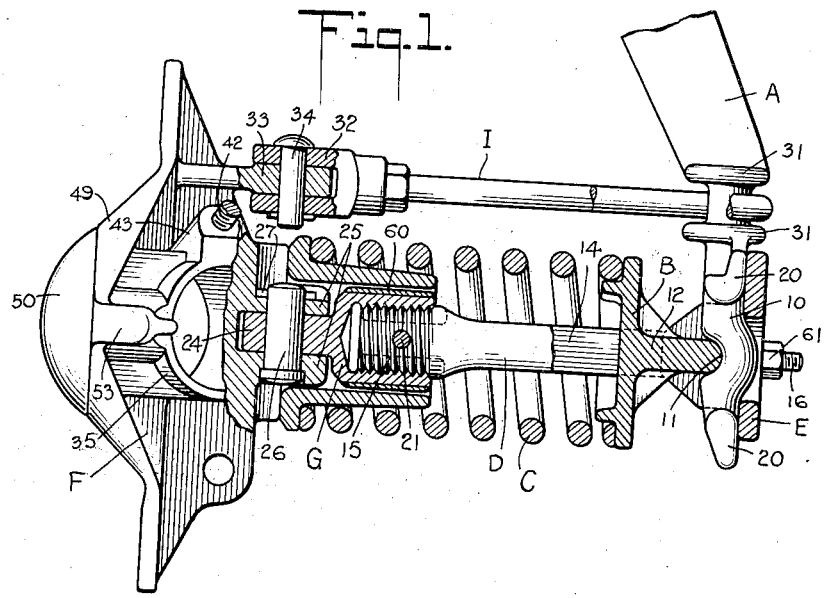
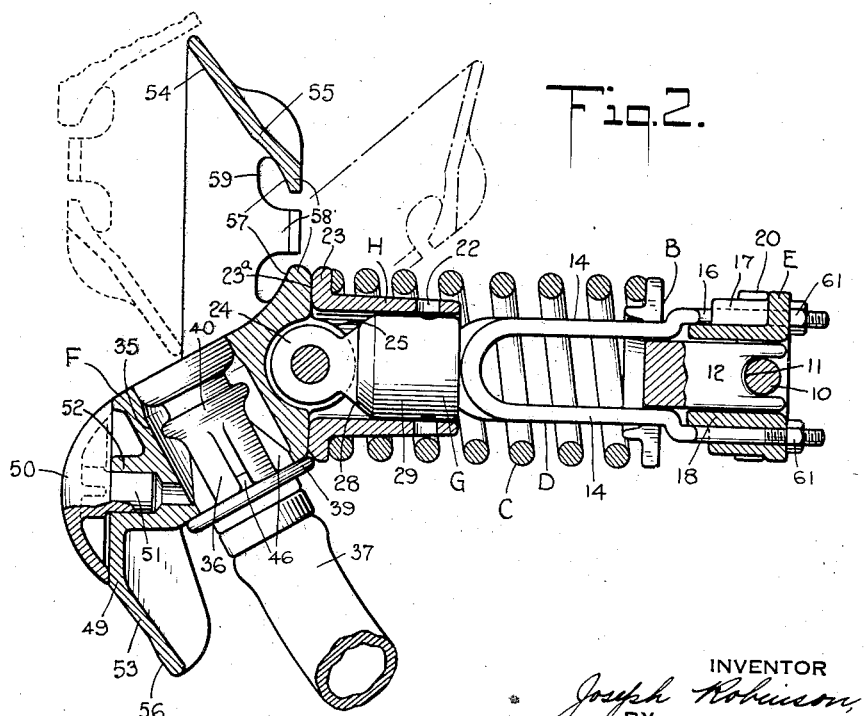
INVENTOR
Joseph Robinson,
BY
ATTORNEYS Aug. 21, 1934.    J. ROBINSON    1,970,980
AUTOMATIC TRAIN PIPE COUPLING
Original Filed Dec. 15, 1930    2 Sheets-Sheet 2
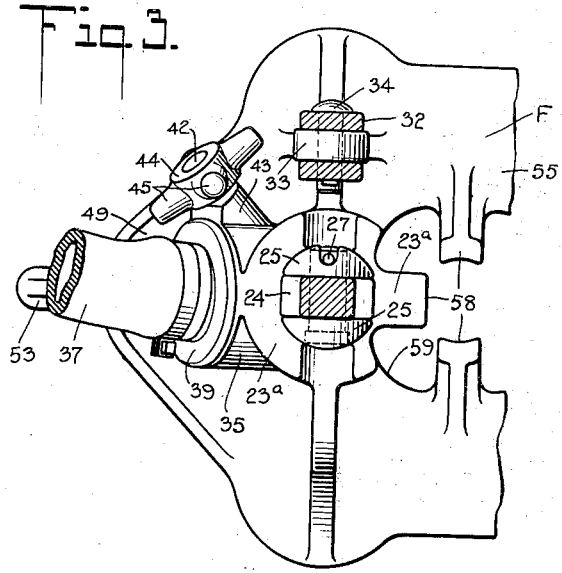
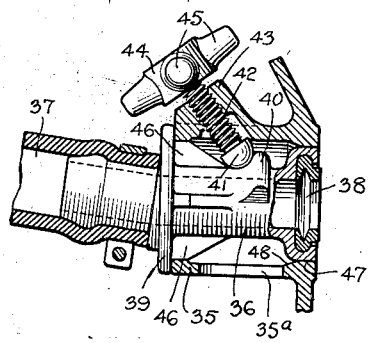
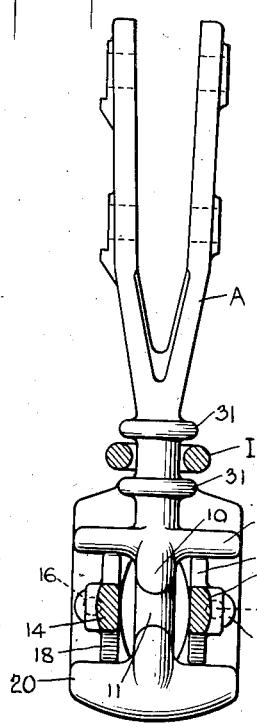
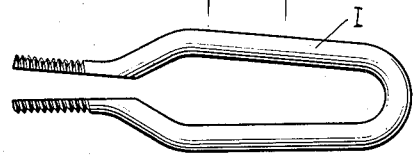
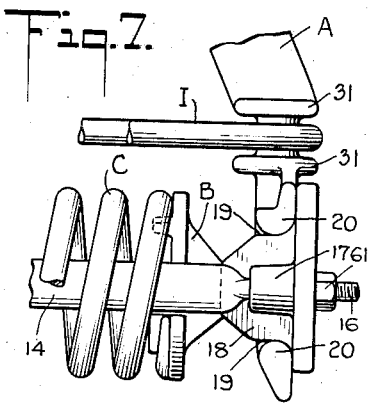
INVENTOR
Joseph Robinson,
BY
Watson, Coit, Morse & Grindle
ATTORNEYS Patented Aug. 21, 1934

1,970,980

UNITED STATES PATENT OFFICE 1,970,980

AUTOMATIC TRAIN PIPE COUPLING

Joseph Robinson, New York, N. Y., assignor of one-half to Roy M. Wolvin, Montreal, Quebec, Canada Application December 15, 1930, Serial No. 502,479
Renewed January 11, 1933

9 Claims. (Cl. 285—58)

This invention relates to automatic train pipe couplings, and more particularly to that type thereof in which the coupling head is of the pin and funnel type with the funnel located on the knuckle side of the car coupler of the car equipped. When the funnel is so located, to avoid breakage it becomes necessary that the coupling head shall pivot or rotate on the forward end of its support when the couplers slip past each other, particularly on the knuckle side, as they frequently do in service. In a coupling head having its air conduit disposed thereon obliquely to the longitudinal direction of the connector, which is the type of head that forms a part of this application, the funnel cannot be located elsewhere than on the knuckle side of the car coupler. When the couplers slip by the pivotal movement of the coupling head is often of considerable extent and often places the train pipe hose under considerable strain. And inasmuch as the air conduit must be capable of being removed and replaced to permit of the renewal of gaskets while mated coupling heads remain coupled, it becomes necessary, because of the strain on the hose under extreme pivotal movement of the head, to provide a powerful retaining means for the replaceable conduit.

These objects and improvements are accomplished by the constructions and arrangements hereinafter described and illustrated in the accompanying drawings in which Figure 1 is a sectional side elevation of my improvement;

Figure 2 is a sectional plan view thereof;

Figure 3 is a rear view of the coupling head. In this view a part of the funnel of the head is broken away;

Figure 4 is a sectional side elevation through the housing for the conduit or air fitting of my improved coupling head showing the fitting mounted therein, and showing also the rugged means for removably holding the fitting in place;

Figure 5 is a plan view of the supplementary supporting rod or member I;

Figure 6 is a front view in elevation of the bracket A of my improvement with the spring seat B omitted;

Figure 7 is a detail view in elevation of the rear portion of my improved support showing the lower end of the bracket A and the universal joint; and Figure 8 is a front elevation of the spring seat or pivot block B with the yoke D shown in section. In this view the bracket A and the flange or stop member E are omitted.

My improved automatic coupling is supported from the car or from the coupler in any desired manner as by the usual lug welded to or cast integral with the car coupler head, not shown. To the lug the bracket A of my improvement is suitably attached as by bolts or rivets. At its lower end the bracket is provided with a vertically disposed lug or seat 10 preferably round in cross section and offset rearwardly, or otherwise arranged to provide a depression or recess to form a seat 11 on the front face of the lower end of the bracket, as shown in Figure 1. A pivot block or spring seat B is provided with a rearwardly extended somewhat elongated portion 12 which spans the lug 10 and is seated in said seat for rocking movement thereon, the contacting surfaces of said pivot block and said seat 11 being flared in opposite directions. The pivot block is provided on its front face with a seat for the buffer spring C, and has in front view the general outline of an inverted T to permit of easy assembly—see Figure 8. Spanning the lower end of the bracket and the pivot block B, and lying within said buffer spring C, I provide a yoke D comprising spaced straps or portions 14 which lead rearwardly away from the forward enlarged hollow threaded end 15 of the yoke and span the universal joint of my improvement, as illustrated particularly in Figures 1 and 2. The rear portions of the straps or arms 14 are offset laterally, Figure 2, and terminate in cylindrically shaped portions 16 which extend through and closely fit within relatively deep seats or bearings 17 formed integrally with the flange or stop member E of my improvement. The connection between the portions 16 and the stop E is preferably such as to make a firm and powerful union between these parts. The stop is provided with vertically disposed walls or webs 18 which at their top and bottom edges extend horizontally a short distance as at 19—Figure 7—and then taper inwardly towards the straps 14 as shown. These webs or portions lie between the projections or crosswise extending lugs or shoulders 20 of the bracket, Figures 6 and 7, and fit rather closely therebetween to prevent undue rotation of the coupling head F from the normal position shown in Figures 1 and 3. The threaded portions 16 of the straps 14 are of ample strength and length to permit the coupling head F to be drawn rearwardly against the spring C until the desired initial compression or resistance in the spring is secured, when assembling the parts. Or this movement, and the assembly of the head, may be obtained by screwing the head onto the yoke D through the medium of the threaded connection between the forward end 15 of the yoke and the swivel head G of my improvement. When the head is thus assembled onto the yoke the swivel member and the yoke are locked in position by means of a suitable pin 21 which passes therethrough. The pin is inserted between the coils of spring C and through the enlarged openings 22 in the collar or abutment housing H. This housing is made of any suitable material and is slidably mounted on the swivel member G and lies within the spring C. At its forward end it is provided with an annular seat 23 against which the spring rests, and its front face bears normally against an annular ring, or suitable bearing surfaces 23ª, formed on the rear of the coupling head F, shown particularly in Figure 3. Projecting rearwardly from the rear side of the head, and suitably spaced apart to receive the perforated eye 24 of the swivel member G, are suitable lugs 25. A swivel or anchor pin 26 of rugged construction passes vertically through these lugs and the swivel eye and pivotally and powerfully anchors the parts together. A cotter 27 holds the swivel pin in place as does also the housing or sleeve H. It will be noted that the swivel member G is tapered inwardly as at 28. This is done to reduce the width of the swivel eye where it joins its barrel or hollow body portion 29. This arrangement allows the head F to pivot on the forward end of the yoke (considering the swivel member as a part of the yoke) to the position shown by the dot and dash lines, Figure 2, and serves to provide an abutment or stop 30 for the lug or portion 23ª of the head to strike against when the head pivots to the extreme position described. It will be noted that the axis of the swivel pin 26 and the surfaces of the lugs 23ª against which the collar H bears, are in the same plane.

A supplementary supporting rod I, split and threaded at its forward end as shown in Figure 5, spans the bracket A loosely and is pivoted thereon and lies between the supporting collars or annular shoulders 31 from between which it cannot be accidentally dislodged. At its forward end the rod carries a forked head 32 adjustably secured to the rod, as by threads, and spanning a suitable lug 33 formed on the connector head F. The head of the rod is pivoted to the lug by means of a pin 34 the axis of which is preferably in the same plane as the axis of the swivel pin 26.

The coupling head F is of the pin and funnel type, with the funnel located to the left of the center line of the connector viewed from the front. This location places the funnel on the knuckle side of the car coupler in general use on American railways, a fact important in connection with this invention as will be later pointed out. Extending diagonally of the longitudinal center line of the connector, and removably mounted in a housing or nipple 35 of the coupling head, I provide a fitting or conduit 36 which suitably receives the lower end of the usual train pipe hose 37. This fitting is provided at its forward end with a suitable annular groove carrying an air expanded or balloon type of gasket 38, see particularly Figure 4. The conduit is provided with an annular shoulder or collar 39 which abuts the rear face of the housing or nipple 35 and serves not only to close the housing against admission thereto of snow, ice, etc. but serves also as a stop for limiting the forward movement of the conduit 36 in the housing 35 and properly positioning the gasket 38 with respect to the pulling face of the head F. An elongated opening 35ª formed in the bottom of the housing serves as an exit for such objectionable foreign matter as might accumulate therein.

Between its gasket carrying end and the shoulder 39, the conduit is provided with a semi-annular collar or lug 40 against which the nose 41 of an adjustable threaded rustproofed plug 42 abuts. The plunger is threaded diagonally through a lug 43 arranged on the upper or other side of said housing and serves to powerfully anchor the conduit in the housing. Faces or supporting ribs, inclined at their top faces as shown, extend radially from opposite sides of the conduit and serve to position its rear end in the housing. A suitable nut 44, preferably having wings or projections 45, is riveted to the rear or outer end of the plunger 42 after the plunger is assembled into the threaded lug 43 from within the housing 35. Thus assembled, the plunger cannot, because of its enlarged forward end 41, be accidently lost or removed. The plunger serves to shift the conduit 36 into and out of the final assembled position (Figure 4) and, of course, when threaded rearwardly the proper extent it allows the conduit to be completely removed from the housing 35. Thus a worn gasket 38 may be replaced with a new gasket while the connector heads remain coupled. Webs or guide lugs 46 extend parallel to the axis of the forepart of the conduit 36, and thence incline inwardly as shown. They serve to vertically position the rear part of the conduit, and act as bearing lugs or guides which slide along the inner wall of the housing 35 as the conduit is moved to the service position. To facilitate such movement, and guide the gasket carrying end of the conduit into its service position in the face of the coupling head F (Figure 4) I provide the housing with an annular seat 47 inclined at 48.

To the right of the longitudinal center line of the connector, viewed from the front, I provide my improved coupling head F with a horn or base 49 having a relatively short and wide or blunt curved nose 50 which is formed separately of the head, or integral therewith, and is provided with a shank 51 which is pressed into a bore or bearing 52 formed on the head, as shown particularly in Figure 2. Adjacent the nose 50, and integral with the base 49, I provide an inclined laterally extending lug or guiding pilot 53 which, under extreme coupling conditions, engages the inner wall 54 of the funnel 55 and assists in aligning the heads. The guide or pilot is provided with a bearing surface 56 which is either fitted to or lies close to the wall 54 when opposing heads are coupled, and it may be made to any desired shape, either wider or narrower than shown, and with or without a ball shaped rear or outer end.

It will be understood that the nose 50 may be made of any suitable material. It is preferably forged and hardened. When in the coupled position it rests in the rearwardly offset bearings 57 formed at the apex of the funnel 55. These bearings or seats consist of four lugs 58, spaced apart, and one of which forms the seat 23ª hereinbefore described, for the sleeve or collar H, see Figure 2. The metal between the lugs is cut away to form openings 59 for the exit of foreign substances that might otherwise accumulate in the funnel and interfere with the proper seating of the heads F.

Passing the conduit 36 through the head at an angle to the longitudinal direction of the connector presents the advantage of giving the air a direct course from one car to the other. It is an advantage secured only by placing the funnel of the connector head on the knuckle side of the car coupler, that is on the left side of the center line of the connector viewed from the front.

The funnel cannot be otherwise placed without sacrificing the advantage of passing the fitting through the head at an angle to the longitudinal direction of the connector. When located as described the funnels of opposing connectors will overlap, as shown in dotted lines in Figure 2, when car couplers slip by on the knuckle side, as they occasionally do in service. When this happens the buffer spring C will be compressed solid, unless the head is provided with the swivel joint hereinbefore described, and as the compressional travel of the spring is not sufficient to take care of car coupler-slip-bys on the knuckle side, which frequently amount to as much as 15" or 20", the bracket A or other parts of the connector will be broken. But by connecting the coupling head F to the yoke D by means of my improved swivel joint the head may rotate to the position shown by dot and dash lines in Figure 2, and thus avoid damage to any of the connector parts. Under car coupler slip-bys of the character described the coupling head E rotates, of course, against the tension of the buffer spring C, the housing or sleeve H sliding rearwardly along the swivel head or barrel G and over the fork formed by the straps 14 of the yoke D. To prevent rust fouling movement of the sleeve H, I either pack the joint with a heavy lubricant, or I provide the swivel head G with a bronze or other suitable bushing 60 firmly pressed onto the swivel head. The resistance of the buffer spring C is such as to make my improved swivel joint relatively stiff so as to prevent undesired movement in it when the cars pass swiftly around sharp curves, or suddenly assume substantial differences in height, or when the cars are being coupled under either of these conditions. Movement to accommodate the connector to these conditions is provided by the universal joint formed between the pivot block B and the lug 10 of the bracket, Figures 1 and 2.

It will, of course, be understood that if the car couplers slip by on the guard arm side, which is on the right hand side of the connector viewed from the front, my improved swivel or pivot joint connection between the head F and the yoke D will rotate in the opposite direction to that shown by the dot and dash lines in Figure 2. It will also be understood that especially during coupler slip-bys great strain is inevitably placed upon the hose 37, hence the importance of the powerful locking means illustrated in Figure 4 for the conduit 36.

While I show the stop or flange member E as being generally U-shaped viewed from the top, and provided with two vertically disposed webs 18 lying on opposite sides of the longitudinal center line of the connector and fitting, as aforesaid, closely between the shoulders 20 of the bracket when in the normal uncoupled position, it will be understood that this stop member may be formed integral with the fork straps 14 of the yoke D and all the assembly compression of the spring C secured by thread connection between the swivel member G and the yoke. If preferred, the yoke and the swivel member may be made integral and the assembly compression of the spring C obtained by the adjustment nuts 61. It will be noted that the stop E bears against the rear face of the lower portion of the bracket A at points considerably above and below the center of the seat 11, Figures 1 and 2. With this arrangement the supporting rod I may be omitted if preferred by slightly further compressing the spring C. With the supporting rod in use the vertical length of the flange or stop E may be considerably lessened from that shown.

What I claim is:

1. An automatic train pipe coupling comprising in combination, a coupling head, a bracket, said bracket having formed on the front face of its lower portion a seat, a member spanning the bracket and extending forwardly thereof, a coupling threadingly connected to said member and pivotally connected to said head at the rear side of the latter, a pivot block projecting into said member and mounted on the seat on said bracket for rocking movement thereon, a sleeve embracing the pivotal connection between said member and said head and having sliding relations thereto, and a spring interposed between the bracket and the head and surrounding said member and resting at one end upon said pivot block and at the other end upon said sleeve, said spring serving to project said coupling head and to yieldingly resist pivotal movement thereof.

2. An automatic train pipe coupling comprising in combination, a coupling head having rearwardly extending projections on its rear side, a swivel member having an eye disposed between said projections and pivotally arranged therein, a pivot block pivotally seated on the front face of the lower portion of said bracket, a member spanning said bracket and said pivot block and adjustably connected to said swivel member, a housing slidingly arranged over said swivel member with its front face abutting the rear side of said coupling head in approximately the plane of the axis of said pivot, and a spring supported at one end on said sleeve and at the other end on said pivot block and serving to extend the coupling head and to yieldingly resist pivotal movement of said head.

3. An automatic train pipe coupling comprising in combination, a coupling head, a bracket for supporting the head from a fixed part of the car, said bracket having on its lower front face a seat, a pivot device mounted on said seat for rocking movement thereon, a member spanning said bracket and said pivot block and projecting forwardly of the bracket, said member being pivotally connected to the rear side of said coupling head, a spring surrounding the member and bearing at one end upon said pivot block and supported at the forward end adjacent the rear side of said head, a supplementary supporting rod embracing said bracket above said pivot block and adapted to pivot on the bracket, and means at the forward end of said supporting rod for pivotally connecting the rod to said coupling head with the axis of its pivot disposed in substantially the same plane as the axis of the pivotal connection between said member and said coupling head.

4. An automatic train pipe coupling comprising in combination, a coupling head, a bracket for supporting the head from a fixed part of the car, said bracket having a seat formed on the front face of its lower portion and provided above and below said seat with crosswise extending shoulders or lugs, a member spanning said bracket and having widened portions positioned between said lugs and engaging therewith to prevent undue rotation of said coupling head about its longitudinal axis, a pivot block extending into said member and mounted on the seat on said bracket for rocking movement thereon, said member being pivotally connected to the rear side of said coupling head and having threaded means for adjusting said head longitudinally relative to said bracket to place said spring under compression in assembling the parts, a sleeve interposed between one end of said spring and said coupling head, and a supplemental supporting rod embracing said bracket above said pivot block and between annular retaining shoulders formed on the bracket above said block, said supporting rod being pivotally and adjustably connected to said coupling head.

5. An automatic train pipe coupling comprising in combination, a coupling head, a bracket for supporting the head from a fixed part of the car, a member extending rearwardly from the head and spanning said bracket and having on its rear portion a projection normally engaging the rear face of the bracket, said bracket being provided with laterally extending shoulders or lugs and said member being provided with vertically disposed webs closely fitting between said lugs and having upper and lower edges which extend parallel to said member and then incline inwardly in the vertical plane toward the center of said member, a support for a spring pivotally mounted on the front face of said bracket, and a spring supported on said spring support and acting to normally hold said projection against the rear face of said bracket and to place said coupling head under pressure in coupling.

6. An automatic train pipe coupling comprising in combination, a coupling head provided with a chamber extending obliquely to the longitudinal center line of the head, means for supporting the head on a fixed part of the car, said means including a bracket and a member which spans the bracket and is pivotally connected at its forward end to said head, a spring interposed between said bracket and the rear side of said coupling head to yieldingly project the head and resist pivotal movement thereof about said pivotal connection, a train pipe hose connected to said head by means of a conduit removably mounted in said chamber, and rugged means carried by said chamber for removably retaining said conduit in said chamber and for effectually resisting the strains set up in said hose when said coupling head pivots as the car coupler slips by on the knuckle side in service.

7. An automatic train pipe coupling comprising in combination, a coupling head, a bracket for supporting the head from a fixed part of the car, a spring support pivotally mounted on said bracket, a member extending from the head rearwardly and spanning said bracket and the pivotal connection between the bracket and said support, a spring mounted on said spring support for yieldingly projecting said head, and means for preventing undue rotation of said head about the longitudinal axis of said member, said means including a part which spans said bracket and is adjustably connected to the rear portion of said member.

8. An automatic train pipe coupling comprising in combination, a coupling head, a bracket for supporting the head from a fixed part of the car, a spring support pivotally mounted on said bracket, a member extending from the head rearwardly and spanning said bracket and the pivotal connection between the bracket and said support, a spring interposed between said bracket and said coupling head and mounted on one end of said spring support and at the other end adjacent said coupling head, and means for preventing undue rotation of said coupling head about the longitudinal axis of said member, said means including a part having a pair of forwardly extending lugs which span the lower portion of said bracket, and means for adjustably securing said part to said member and for placing said spring under tension in assembling the parts.

9. An automatic train pipe coupling comprising in combination, a coupling head, a bracket, a member connected to said head and extending rearwardly past said bracket, a coupling threadingly connected to said member and pivotally connected to said head at the rear side of the latter, a sleeve embracing the pivotal connection between said coupling and said head and having sliding relation to said coupling, a spring interposed between said bracket and head and surrounding said member and bearing at its front end against said sleeve, said spring serving to project said coupling head and to yieldingly resist pivotal movement thereof.

JOSEPH ROBINSON.